Nov. 23, 1926.
1,608,088
C. Y. DUNCAN
LOOP HOLDER FOR PAN LIDS
Filed May 12, 1926
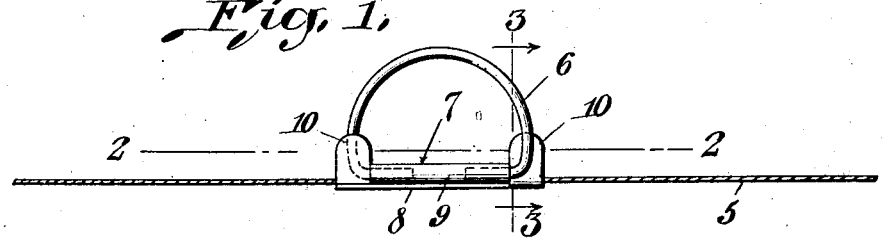
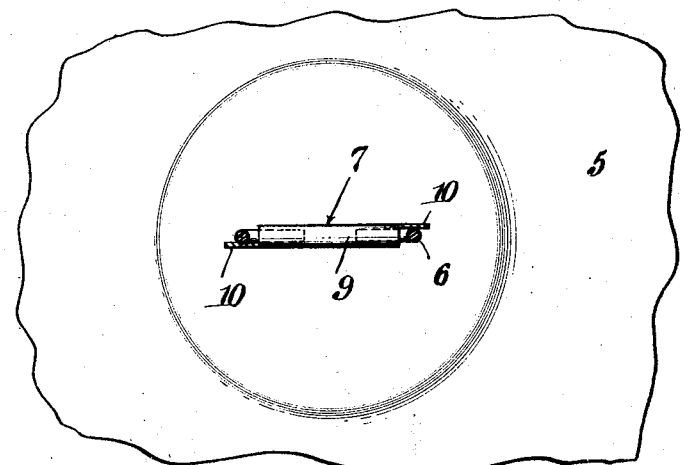
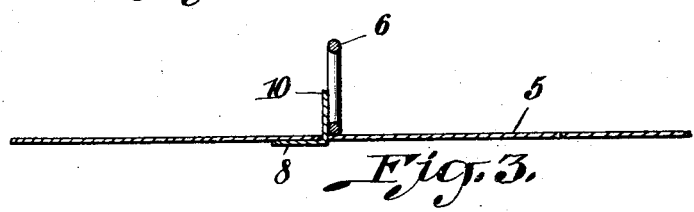
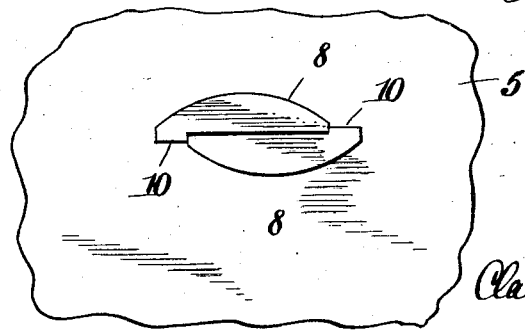
Inventor:
Clara Young Duncan,
by Douglas B. Saw.
Atty.

Patented Nov. 23, 1926.

1,608,083

UNITED STATES PATENT OFFICE.

CLARA YOUNG DUNCAN, OF HAZLETON, PENNSYLVANIA.

LOOP HOLDER FOR PAN LIDS.

Application filed May 12, 1926. Serial No. 108,541.

This invention relates to loop or ring holders for lids of cooking vessels, such as pans and the like, an important object of the invention being to provide means whereby the lifting ring or loop may be maintained in such position when the pan is being used as not to become so heated as to endanger burning of the fingers in removing the lid from the vessel.

A further object of the invention is to provide means of improved nature for securing the loop to the lid and which may be operated in such manner as to permit of the loop being positioned flat upon the pan to facilitate shipping or storing of such lids.

A still further object is to provide a loop or ring holder characterized by simplicity of construction, which may be readily applied to the pan lid in the usual way, which is of extremely inexpensive construction and manufacture and which will prove highly effective in practice.

With these objects in view, together with others which will appear as the description proceeds, the invention consists in the novel construction, combination and arrangement of parts, all as will be described more fully hereinafter, illustrated in the drawing, and particularly pointed out in the claims.

In the drawings:

Fig. 1 is a section taken diametrically through a pan lid and illustrating the adaptation thereto of a holder embodying my invention, Fig. 2 is a sectional view taken substantially upon line 2—2 of Fig. 1, Fig. 3 is a similar view taken upon line 3—3 of Fig. 1, and Fig. 4 is a bottom plan view of a portion of the lid showing the manner in which the loop holding clip is usually attached to the pan lid.

The lids of cooking vessels comprise usually a substantially flat annular plate 5 formed of tin or other like metal of a size to properly cover the pan or vessel, and this lid usually has a ring 6 carried thereby to facilitate lifting or applying the lid to the vessel. The ordinary construction usually involves a tin or other like metal clip 7 disposed substantially centrally of the lid and which securely holds the ring or loop to the latter. This clip may be soldered or riveted to the pan, or may in any other desired manner be secured thereto. In the present instance, however, the ring holding clip includes anchoring elements 8 formed at the ends of the clip and passed through a central opening in the pan and deflected laterally as shown in Fig. 4. This construction enables the barrel portion 9 of the clip to be disposed upon the upper surface of the lid, while the deflected members 8 upon the same possess sufficient rigidity to hold the barrel firmly positioned upon the lid. The loop holding clips of this character thus hingedly support the member 6, so that the latter may swing down and lie flat upon the top of the lid, and this frequently causes the loop to become so heated when the lid is in use as to preclude manipulation of the lid by the loop.

In the present invention, means are associated with a clip of this character which will maintain the loop normally in upstanding position, so that the loop cannot become heated to such extent as to prevent handling without danger of burning the fingers.

In carrying out the invention, the usual clip is lengthened slightly and portions of the metal of each of the anchoring members 8 are cut so as to provide normally upstanding ears 10, one at each end of the clip and extending through from the bottom to the top side of the lid. These ears are so positioned as to lie next adjacent to the end portions of the loop or ring 6, and one is positioned upon each side of the said ring. The ears thus formed when in true upright position maintain the loop perpendicular to the pan lid, so as to be readily grasped when required and so as not to become unduly heated.

Inasmuch as the ears 10 form an integral part of the clip, and as the latter is usually constructed of thin pliable metal, the ears 10 may be readily bent back upon the pan lid to permit of the ring lying substantially flat against the same, to economize space in packing or shipping the lids without danger of breaking the loops or their holders therefrom.

From the foregoing it is apparent that I have provided a holder for the loops of pan lids which departs very little from the usual construction, but which possesses means for adequately accomplishing the purposes set forth. While the present is the preferred embodiment of the invention, it is nevertheless to be understood that variations in the construction and location of the ears may be